(12) United States Patent
Hung et al.

(10) Patent No.: US 11,307,458 B2
(45) Date of Patent: Apr. 19, 2022

(54) DISPLAY DEVICE

(71) Applicants: Luca Hung, Tainan (TW); Joe Huang, Chiayi County (TW)

(72) Inventors: Luca Hung, Tainan (TW); Joe Huang, Chiayi County (TW)

(*) Notice: Subject to any disclaimer, the term of this patent is extended or adjusted under 35 U.S.C. 154(b) by 0 days.

(21) Appl. No.: 17/029,903

(22) Filed: Sep. 23, 2020

(65) Prior Publication Data

US 2022/0091463 A1 Mar. 24, 2022

(51) Int. Cl.
*G02F 1/13357* (2006.01)
*G02F 1/1333* (2006.01)
*G02F 1/1335* (2006.01)

(52) U.S. Cl.
CPC .... *G02F 1/133606* (2013.01); *G02F 1/13336* (2013.01); *G02F 1/133607* (2021.01)

(58) Field of Classification Search
CPC .................................................. G02F 1/133302
See application file for complete search history.

(56) References Cited

U.S. PATENT DOCUMENTS

| 9,684,209 B2 * | 6/2017 | Yu | G02F 1/1339 |
| 2003/0067576 A1 | 4/2003 | Cho | |
| 2008/0185587 A1 * | 8/2008 | Whangbo | H01L 27/1218 257/59 |
| 2012/0135181 A1 * | 5/2012 | Tseng | B32B 7/12 428/81 |
| 2015/0029692 A1 * | 1/2015 | Chung | G02F 1/133606 362/19 |
| 2017/0304980 A1 * | 10/2017 | Jotz | C03C 1/004 |
| 2018/0284529 A1 * | 10/2018 | Sato | G02F 1/133512 |
| 2019/0384084 A1 * | 12/2019 | Tang | G02F 1/13338 |
| 2020/0285271 A1 * | 9/2020 | Huang | G02F 1/13336 |

FOREIGN PATENT DOCUMENTS

| CN | 202006401 U | 10/2011 |
| CN | 104245615 A | 12/2014 |
| CN | 107203059 A | 9/2017 |
| TW | 201104306 A | 2/2011 |
| WO | WO-2010104039 A1 | 9/2010 |

* cited by examiner

*Primary Examiner* — Alexander P Gross
(74) *Attorney, Agent, or Firm* — Patterson + Sheridan, LLP

(57) ABSTRACT

A display device is provided, including two substrates and a liquid crystal layer. Each of the substrates has two opposite surfaces and two opposite sides. The liquid crystal layer is sandwiched between the two substrates. At least one of the two substrates has an inclined portion on at least one of the two opposite sides which is connected to one of the two opposite surfaces, and has an included angle greater than 90 degrees and less than 180 degrees in association with the connected surface.

16 Claims, 4 Drawing Sheets

DISPLAY DEVICE

BACKGROUND OF THE DISCLOSURE

Field of the Disclosure

The application relates in general to a display device, and in particular, to a display device having a liquid crystal layer.

Description of the Related Art

The current trend of display devices having a display panel (for example, in televisions, tablet computers or smartphones) is moving towards large screens and narrow bezels. However, due to the narrow bezels in an electronic device, such an electronic device may experience light leakage at its edge. Therefore, how to address the aforementioned problem has become an important issue.

BRIEF SUMMARY OF DISCLOSURE

To address the deficiencies of conventional products, an embodiment of the disclosure provides a display device, including two substrates and a liquid crystal layer. Each of the substrates has two opposite surfaces and two opposite sides. The liquid crystal layer is sandwiched between the two substrates. At least one of the two substrates has an inclined portion on at least one of the two opposite sides which is connected to one of the two opposite surfaces, and has an included angle greater than 90 degrees and less than 180 degrees in association with the connected surface.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

Figure 1:
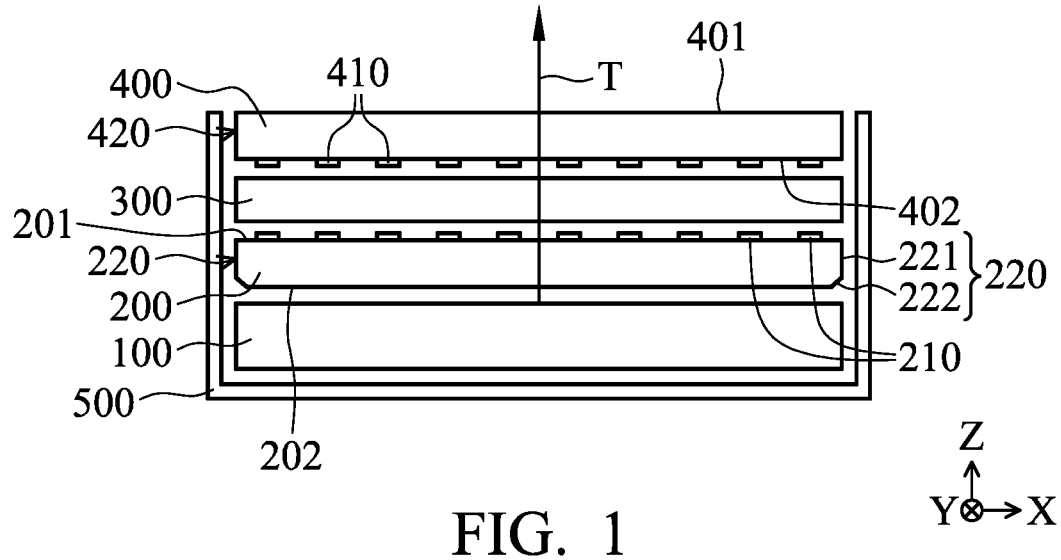
FIG. 1 is a schematic diagram of a display device according to an embodiment of the disclosure.

The making and using of the embodiments of the display device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

In addition, in this specification, relative expressions are used. For example, "below" and "above" are used to describe the position of one element relative to another. It should be appreciated that if a device is flipped upside down, an element that is "below" will become an element that is "above".

When the corresponding component (such as layer or area) is referred to "on another component (or the variant thereof)", it may be directly on another component, or other component may exist between them. On the other hand, when the component is referred to "directly on another component (or the variant thereof)", any component does not exist between them. Moreover, when a component is referred to "on another component (or the variant thereof)", the component and the other component has a positional relationship in a top view direction, the component can be disposed above or below the other component, and the positional relationship is based on the orientation of the device.

In some embodiments of the disclosure, terms concerning attachments, coupling and the like, such as "connected", refer to a relationship wherein structures are secured or attached to one another either directly or indirectly through intervening structures, unless expressly described otherwise.

It should be understood that, although the terms "first", "second", etc. can be used herein to describe various elements, layers and/or sections, these elements, layers and/or sections should not be limited by these terms. These terms are only used to distinguish one element layer or section from another element, layer or section. Thus, a first element, layer or section discussed below could be termed a second element, layer or section without departing from the teachings of the present disclosure. For brevity, the terms "first", "second", etc. may not be used in the specification. The first element and/or the second element in claims can be referred to any element(s) that meets the description in the specification without departing from the spirit and scope of the invention as defined by the appended claims.

The terms "about" and "substantially" typically mean+/−15% of the stated value, for example, +/−10%, +/−5%, +/−3%, +/−2%, +/−1%, or +/−0.5% of the stated value. The stated value of the present disclosure is an approximate value. When there is no specific description to the terms "about" and "substantially", the stated value includes the meaning of "about" or "substantially". Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. Moreover, for brevity, some elements can be suitably omitted in the figures.

Referring to FIG. 1, a display device 10 in the disclosure can include a rectangular display device, a non-rectangular display device, or a curved display device, but it is not limited thereto. The display device 10 can include a bendable display device or a flexible display device, but it is not limited thereto. The display device 10 can include a liquid crystal display device or other suitable display device, but it is not limited thereto. The display device 10 can include a splicing display device, but it is not limited thereto. In this disclosure, the display device 10 can include a thin film transistor liquid crystal display (TFT-LCD), and can be applied to a public information display (PID), a television, a monitor, a notebook PC, a smart phone, or a smart watch, but it is not limited thereto.

The display device 10 primarily includes a light source 100, a first substrate 200, a liquid crystal layer 300, a second substrate 400, and a frame 500. The first substrate 200 is disposed between the light source 100 and the liquid crystal layer 300, and the liquid crystal layer 300 is disposed between the first substrate 200 and the second substrate 400. In other words, the liquid crystal layer 300 is sandwiched between the first substrate 200 and the second substrate 400. The light source 100, the first substrate 200, the liquid crystal layer 300, and the second substrate 400 can be disposed in the frame 500. The frame 500 can protect or affix the aforementioned members of the display device 10, but it is not limited thereto.

The light source 100 can be a backlight module, including one or more luminous bodies to provide light T to the first substrate 200. In some embodiments, the light source 100 is disposed adjacent to the first substrate 200. In some embodiments, the light T emitted from the light source 100 passes through the first substrate 200, the liquid crystal layer 300, and the second substrate 400, and leaves the display device 10 from an upper surface 401 (a display surface) of the second substrate 400.

For example, the luminous bodies in the light source 100 can include a light-emitting diode (LED), a light tube (such as cold cathode fluorescent lamp, CCFL), or other suitable light source. The light-emitting diode can be an inorganic light-emitting diode, an organic light-emitting diode (OLED), a mini LED, a micro LED, a quantum dot light-emitting diode (QLED or QD-LED), other suitable light-emitting diode, or a combination of the aforementioned LEDs, but it is not limited thereto.

In this embodiment, the light source 100 is direct-type backlight. In some embodiments, the light source 100 can be replaced to a side-light type backlight module. In some embodiments, the light source 100 is not an ambient light.

Figure 2:
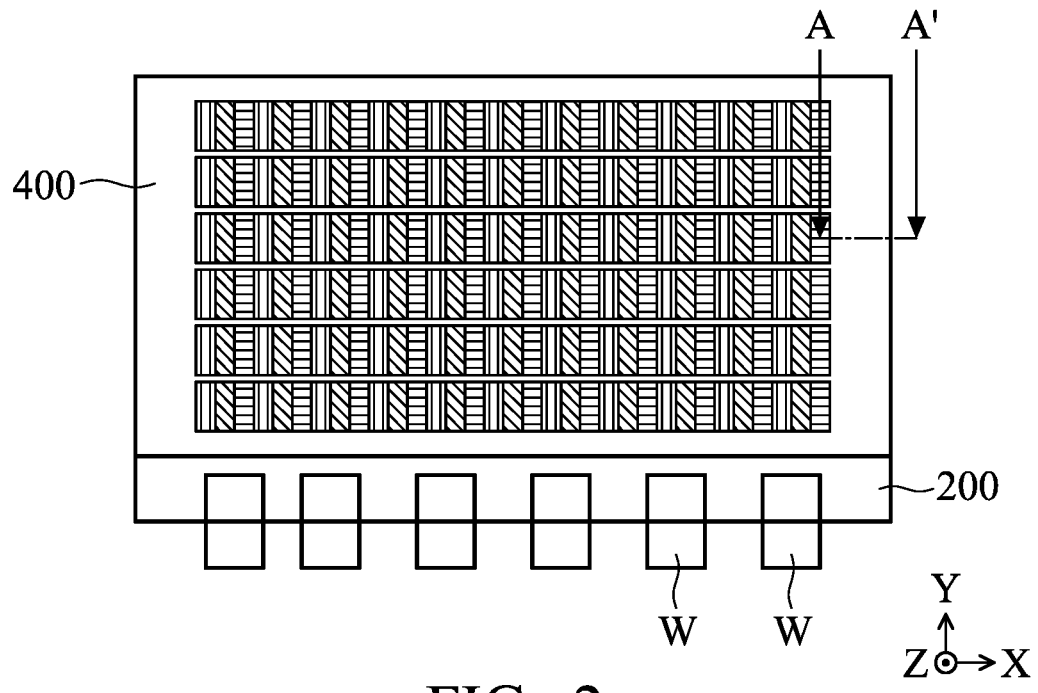
FIG. 2 is a schematic diagram of a substrate according to an embodiment of the disclosure.

Referring to FIGS. 1 and 2, a plurality of wires 210 can be arranged on a side of the first substrate 200 facing the liquid crystal layer 300, and the wires 210 can be electrically connected to a circuit board W disposed on a side of the first substrate 200. The circuit board W can be electrically connected to an external circuit. The signal of the external circuit (such as a control signal) can be transmitted to the first substrate 200 via the circuit board W. In some embodiments, the circuit board W can be configured to electrically connect to other components in the display device 10. Besides the wires 210, a transistor (such as a thin film transistor), a color filter, a light shielding layer, or other suitable member and/or a combination of the aforementioned members can be disposed on the first substrate 200, but it is not limited thereto. The first substrate 200 can include a flexible substrate or an inflexible substrate. The material of the first substrate 200 can include glass, quartz, polycarbonate (PC), polyimide (PI), polypropylene (PP), polyethylene terephthalate (PET), other suitable material, or a combination of the aforementioned materials, but it is not limited thereto. The wires 210 can be data lines, data cables, common lines, or touchscreen lines, but it is not limited thereto. The wires 210 can include lines with metal (such as aluminum, copper, or the alloy thereof) and/or transparent conductive material (such as indium tin oxide), but it is not limited thereto. In some embodiments, the wires 210 can be disposed on the first substrate 200 and/or the second substrate 400. For example, the wires 210 can be disposed on both the first substrate 200 and the second substrate 400 (such as the surface of the second substrate 400 facing the liquid crystal layer 300), but it is not limited thereto. In some embodiments, one or more insulation layers can be disposed between the wires 210 and the substrate (such as the first substrate 200). The insulation layer(s) can include SiOx, SiNx, PFA, other suitable material, or a combination of the aforementioned material, but it is not limited thereto. The circuit board W can include flexible printed circuit (FPC) and chip on film (COF), but it is not limited thereto.

One or more light shielding members 410 or color filters (not shown) can be disposed on a side of the second substrate 400 facing the liquid crystal layer 300. The material of the second substrate 400 can be the same as or similar to that of the first substrate 200, so that the material thereof are not repeated in the interest of brevity. In some embodiments, the shielding member 410 can be a black matrix having a grid structure, but it is not limited thereto. In some embodiments, the light shielding member 410 can be disposed on the first substrate 200 and/or the second substrate 400. In some embodiments, one or more insulation layers can be disposed between the light shielding member 410 and the substrate (such as the second substrate 400). The insulation layer(s) can include organic material, inorganic material, or other suitable material, but it is not limited thereto.

Figure 3:
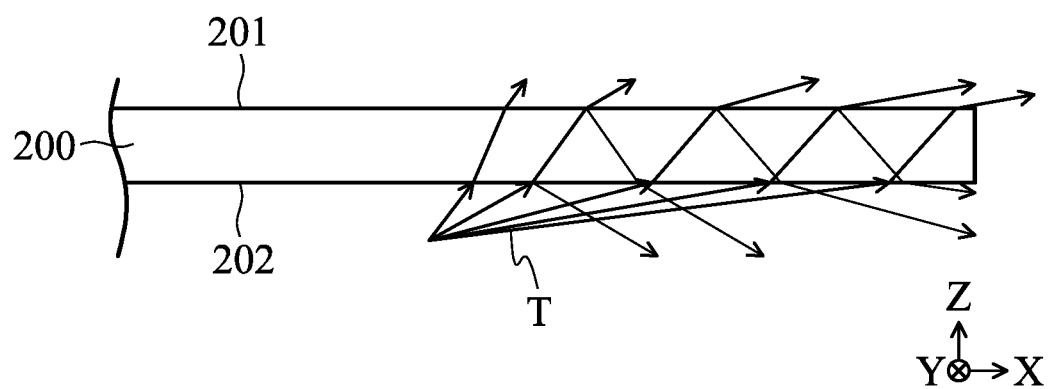
FIG. 3 is a schematic diagram of a conventional substrate.

When the light T emitted from the light source 100 passes through the first substrate 200 and the second substrate 400, a portion of the light T may be reflected to the edge of the display device 10 by the wires 210 and/or other member. This portion of the light T may leak from the gap between the second substrate 400 and the frame 500, so that the observer facing the display surface can see the light leakage. Furthermore, due to the moving angle, a portion of the light T is reflected or refracted to the edge of the display device 10 at the interface between the light source 100 and the first substrate 200, the interface between the first surface 200 and the liquid crystal layer 300, or the interface between the liquid crystal layer 300 and the second substrate 400. In some embodiments, a portion of the light T generates total internal reflection in the first substrate 200 and/or the second substrate 400 (as shown in FIG. 3), leaves the lateral side of the first substrate 200 and/or the second substrate 400 (such as two opposite sides 220 and/or 420), and is emitted into the gap between the frame 500 and the first substrate 200 and/or the second substrate 400. In this case, the observer facing the display surface may see the light leakage too.

Figure 4:
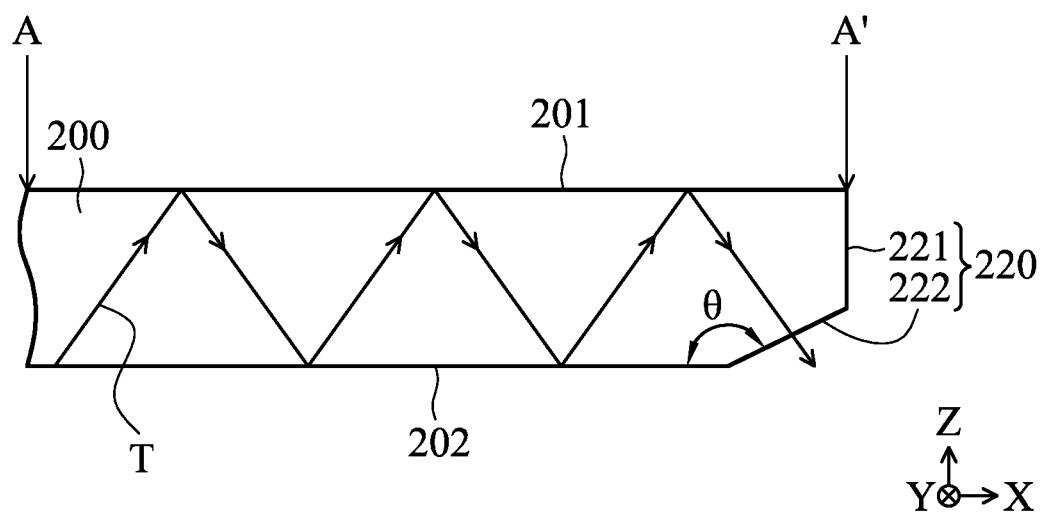
FIG. 4 is a cross-sectional view along line A-A' in FIG. 2.

The display device 10 in this embodiment changes the structures of the first substrate 200 to reduce the light leakage observed by the observer facing the display surface. Referring to FIGS. 1 and 4, the first substrate 200 has two opposite surfaces (i.e. the upper surface 201 and the lower surface 202) and two opposite sides 220 connected to the aforementioned two opposite surfaces.

The upper surface 201 is substantially parallel to the lower surface 202, and a vertical portion 221 and an inclined portion 222 are formed on at least one of the two opposite sides 220. The vertical portion 221 is disposed between the upper surface 201 and the inclined portion 222, and connects the upper surface 201 to the inclined portion 222. The vertical portion 221 is substantially perpendicular to the upper surface 201. In some embodiments, at least a portion of the lateral surface of the first substrate 200 and/or the second substrate 400 can include inclined portion 222 and/or inclined portion, but it is not limited thereto. The inclined portion 222 is disposed between the vertical portion 221 and the lower surface 202, and connects the vertical portion 221 to the lower surface 202. The inclined portion 222 is inclined relative to the lower surface 202. The other one of the two opposite sides 220 can merely has a vertical portion (not shown), and this vertical portion (not shown) can be connected to the upper surface 201 and the lower surface 202 and substantially perpendicular to the upper surface 201 and the lower surface 202, but it is not limited thereto. In some embodiments, the surface of the vertical portion (not shown) is not smooth, and the extending line of the surface can substantially perpendicular to the upper surface 201 and the lower surface 202, but it is not limited thereto. In some embodiments, the lower surface 202 connected to the inclined portion 222 faces the light source 100. In some embodiments, the first substrate 200 adjacent to the light source 100 has two vertical portions 221 and two inclined portions 222 on the two opposite sides 220 (as shown in FIG. 1). In some embodiments, the upper surface 201 and the lower surface 202 are substantially parallel to the X-axis, but it is not limited thereto. In some embodiments, the term "substantially perpendicular to" means the included angle between two lines, two surfaces, or one line and one surface is between 85 degrees and 95 degrees (80°≤the included angle≤90°), but it is not limited thereto.

The upper surface 201 and the lower surface 202 of the first substrate 200 respectively faces the liquid crystal layer 300 and the light source 100. As shown in FIG. 4, in some embodiments, a portion of the light T emitted from the light source 100 enters the first substrate 200 from its lower surface 202, and is reflected or refracted in the first substrate 200 to the inclined portion 222 on at least one side 220 of the first substrate 200. That is, a portion of the light T moves in the first substrate 200, and is guided by the inclined portion 222 to leave the first substrate 200. The guiding direction of the portion of light T guiding by the inclined portion 222 is different from the direction of the light T emitted from the light source passing the first substrate 200 and the second substrate 400 (for example, the direction of the light shown in FIG. 1, and/or the direction of the light leaving from the upper surface 201 shown in FIG. 3, but it is not limited thereto).

In detail, after the light T moving in the first substrate 200 contacts the inclined portion 222, the aforementioned portion of light T can leave the first substrate 200 from the inclined portion 222. Since the inclined portion 222 faces away from the display surface of the display device 10, the light T leaving the first substrate 200 from the inclined portion 222 moves away from the display surface of the display device 10. The probability that the observer facing the display surface sees the light T leaving the substrate from the inclined portion 222 is reduced, so that the light leakage can be improved.

In this embodiment, the inclined angle θ between the inclined portion 222 and the lower surface 202 is greater than 90 degrees and less than 180 degrees (90°<θ<180°), such as 100°, 110°, 120°, 130°, 140°, 150°, 160°, or 170°. Therefore, most of the light T leaving from a side 202 of the first substrate 200 can pass the inclined portion 222. In some embodiments, the included angle θ is between 135° and 165°, but it is not limited thereto. When the included angle θ is small (for example, less than 135°, but it is not limited thereto), the edge of the first substrate 200 becomes thinner, and the strength of the first substrate 200 may be influenced. When the included angle θ is large (for example, greater than 165°, but it is not limited thereto), the inclined portion 222 may have a large region, and the width of the periphery of the display device 10 may be influenced.

Although the inclined portion 222 with large area can efficiently reduce the light leakage at the lateral side, the first substrate 200 may not have enough strength when the dimensions of the vertical portion 221 are too small. Therefore, the length of the vertical portion 221 can be greater than half the thickness of the first substrate 200, and the ratio of the length of the inclined portion 222 to the length of the vertical portion 221 (the length of the inclined portion 222/the length of the vertical portion 221) is between 0.2 and 2 (0.2≤the ratio≤2), such as 0.5, 1, or 1.5, but it is not limited thereto. Thus, it can be ensured that the first substrate 200 has enough thickness and strength, or the light leakage at the lateral side can be efficiently reduced.

Furthermore, the roughness of the surface influences whether the light T can easily pass through the surface. When the roughness of the surface is larger, the roughness surface can destroy a greater amount of the total internal reflection. Therefore, the light T moves toward the surface can leave from the surface easily, and vice versa. Thus, in this embodiment, the roughness of the surface of the inclined portion 222 can be enhanced by grinding, and the roughness of the inclined portion 222 is greater than the roughness of the vertical portion 221. The light T can leave the first substrate 220 from the inclined portion 222 more easily. For example, the roughness of the inclined portion 222 is between 1 μm and 5 μm (1 μm≤the roughness≤5 μm), such as 1.5 μm, 2 μm, 2.5 μm, 3 μm, or 4 μm, but it is not limited thereto. The "roughness" is referred to an arithmetic mean roughness (Ra), that is, the arithmetic mean of the distance from the center line of the sampling part to the appearance deviation value, but it is not limited thereto. For example, the roughness can be measured in a rectangular region with the side length of 10 μm, 50 μm, or 200 μm, but it is not limited thereto. The size of the side length of the rectangular region can be adjusted according to the dimensions of the substrate. In some embodiments, the position of the inclined portion 222 substantially corresponds to the cutting position of the cutter wheel, which cuts a large substrate to the first substrate 200 or the second substrate 400, in the cutting process, but it is not limited thereto. In some embodiments, the first substrate 200 can include two inclined portions, the roughness of one of the inclined portions (such as the inclined portion 222) is different from that of the other one of the inclined portions. In some embodiments, the roughness of one of the inclined portions (such as the inclined portion 222) is the same as that of the other one of the inclined portions, but it is not limited thereto. The second substrate 400 can also include the same structure, so that the features thereof are not repeated in the interest of brevity. In some embodiments, the first substrate 200 can include at least one inclined portion (such as the inclined portion 222), the second substrate 400 can include at least one inclined portion, and the roughness of the inclined portion of the first substrate 200 is different from that of the inclined portion of the second substrate 400. In some embodiments, the roughness of the inclined portion of the first substrate 200 is the same as that of the inclined portion of the second substrate 400. Also, the inclined portion 222 of the first substrate 200 can be greater than the lower surface 202 and/or the upper surface 201 in roughness.

Moreover, as shown in FIG. 2, the light leakage at the side disposed the circuit board W may be shielded by a portion of circuit board W, so that the inclined portion 222 is not required. In other words, the inclined portion 222 and the circuit board W are disposed on different sides of the first substrate 200.

In some embodiment, the second substrate 400 also includes two opposite surfaces (i.e. the upper surface 401 and the lower surface 402) and two opposite sides 420 connected to the aforementioned two opposite surfaces. A vertical portion and an inclined portion are formed on at least one of the two opposite sides 420. The structures and the connection relationships of the upper surface 401, the lower surface 402, the vertical portion, and the inclined portion of the second substrate 400 are the same as or similar to the upper surface 201, the lower surface 202, the vertical portion 221, and the inclined portion 222 of the first substrate 200, so that the structures and the connection relationships thereof are not repeated in the interest of brevity. The display device 10 can further reduce the light leakage at the lateral side by the inclined portion of the second substrate 400, but it is not limited thereto.

In some embodiments, the inclined portion can be merely formed on the first substrate 200 or the second substrate 400 of the display device 10, and the other one of the first substrate 200 or the second substrate 400 is a cuboid without inclined portion, but it is not limited thereto. In some embodiments, the inclined portion is disposed between the liquid crystal layer 300 and the light source 100. In others embodiments, the liquid crystal layer 300 is disposed between the inclined portion and the light source 100.

Figure 5A:
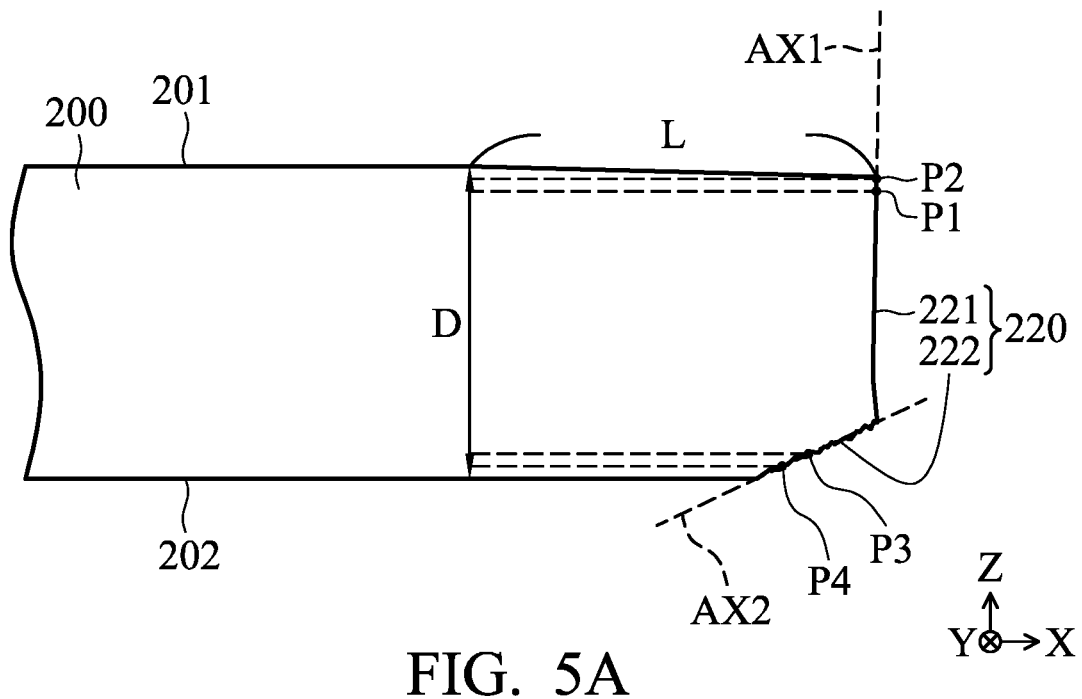
FIG. 5A is a schematic diagram of an actually manufactured substrate according to some embodiments of the disclosure.
Figure 5B:
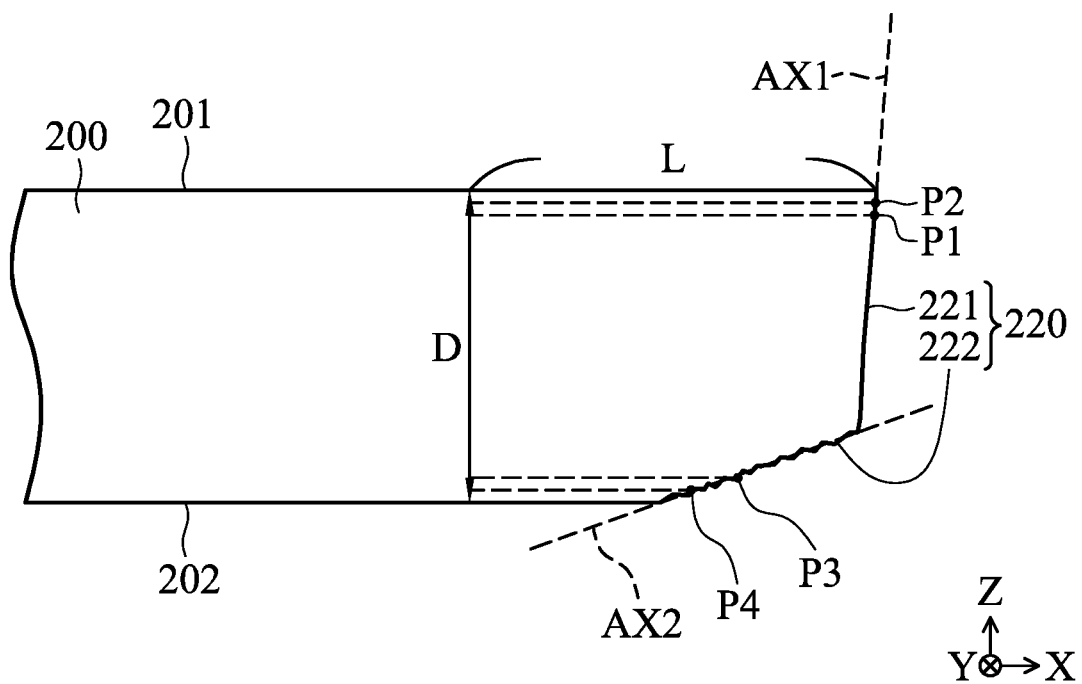
FIG. 5B is a schematic diagram of an actually manufactured substrate according to some embodiments of the disclosure.
Figure 5C:
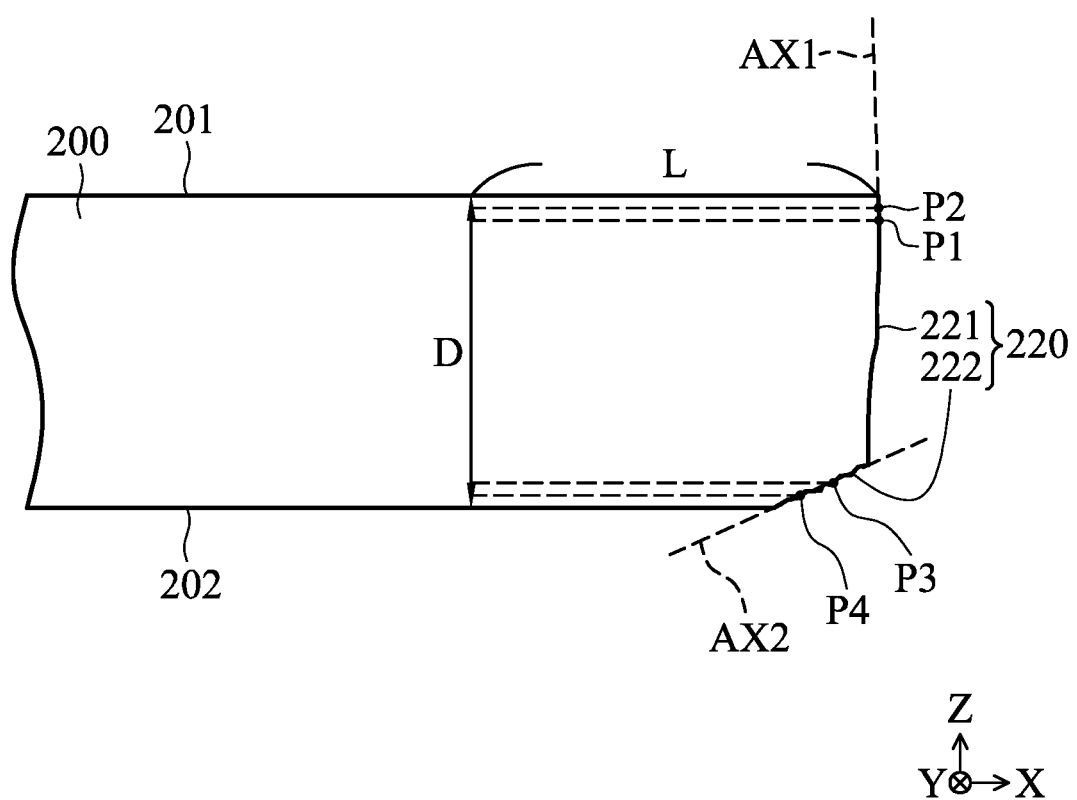
FIG. 5C is a schematic diagram of an actually manufactured substrate according to some embodiments of the disclosure.

FIGS. 5A-5C are schematic diagrams of the first substrate 200 according to different embodiments of the disclosure. As shown in FIGS. 5A-5C, a side 220 of the first substrate 200 includes a vertical portion 221 connected to an upper surface 201, and an inclined portion 222 connected to a lower surface 202. The surface of the inclined portion 222 is not smooth, so that the roughness of the inclined portion 222 is greater than the roughness of the vertical portion 221.

It should be noted that, in some embodiments, the vertical portion 221 and the inclined portion 222 of the first substrate 200 has bumpy surfaces, so that the related parameters can be measured by the following method, but it is not limited thereto. In the normal condition, the related parameters can be directly measured.

First, the user can measure a distance D between the upper surface 201 and the lower surface 402 in a direction perpendicular to the upper surface 201 and the lower surface 402 of the first substrate 200 at a position spaced a distance L away from the corner between the upper surface 201 and the vertical portion 221. For example, the aforementioned distance L can be 0.5 mm, 1 mm, or 2 mm, but it is not limited thereto. The distance L can be determined according to the dimensions or the thickness of the substrate. It should be noted that, the point spaced the distance L away from the vertical portion 221 (the point used to define the distance D) can be projected on the lower surface 202 of the first substrate 200. In other words, the point spaced the distance L away from the vertical portion 221 is not projected on the inclined portion 222.

In the direction substantially perpendicular to the lower surface 202, the position spaced 0.85D away from the lower surface 202 can be projected on one side 220 of the first substrate 200 to form a first intersection P1, and the position spaced 0.99D away from the lower surface 202 can be projected on the side 220 of the first substrate 200 to form a second intersection P2. The connection line between the first intersection P1 and the second intersection P2 is a first virtual line AX1. In the embodiment shown in FIGS. 5A-5C, both the first intersection P1 and the second intersection P2 are located on the vertical portion 221, and the included angle between the first virtual line AX1 and the upper surface 201 of the first substrate 200 is between 80 degrees and 100 degrees (80°<the included angle<100°), such as 82.5°, 85°, 95°, or 97.5°, but it is not limited thereto. In some embodiments, the included angle between the first virtual line AX1 and the upper surface 201 of the first substrate 200 is between 85 degrees and 95 degrees (85°<the included angle<95°).

In the direction substantially perpendicular to the upper surface 201, the position spaced 0.85D away from the upper surface 201 can be projected on the side 220 of the first substrate 200 to form a third intersection P3, and the position spaced 0.99D away from the upper surface 201 can be projected on the side 220 of the first substrate 200 to form a fourth intersection P4. The connection line between the third intersection P3 and the fourth intersection P4 is a second virtual line AX2. In the embodiments shown in FIGS. 5A-5C, both the third intersection P3 and the fourth intersection P4 are located on the inclined portion 222, and an obtuse angle is formed between the second virtual line AX2 and the lower surface 202 of the first substrate 200. This obtuse angle can be referred to the included angle θ between the inclined portion 222 and the lower surface 202.

In the embodiment shown in FIG. 5A, a portion of the upper surface 201 adjacent to the side 220 of the first substrate 200 is inclined toward the lower surface 202, and a portion of the vertical portion 221 is concave. Thus, the included angle between the first virtual line AX1 and the upper surface 201 of the first substrate 200 is between 90 degrees and 95 degrees, but it is not limited thereto.

In the embodiment shown in FIG. 5B, the upper surface 201 is substantially horizontal, so that the included angle between the first virtual line AX1 and the upper surface 201 of the first substrate 200 is between 85 degrees and 90 degrees, but it is not limited thereto.

In the embodiment shown in FIG. 5C, the upper surface 201 is substantially horizontal, and a portion of the vertical portion 221 is convex. Thus, the included angle between first virtual line AX1 and the upper surface 201 of the first substrate 200 is between 90 degrees and 95 degrees, but it is not limited thereto.

The features between the aforementioned embodiments can be used or combined as long as they do not violate the spirit or conflict.

In summary, a display device is provided, including two substrates and a liquid crystal layer. Each of the substrates has two opposite surfaces and two opposite sides. The liquid crystal layer is sandwiched between the two substrates. At least one of the two substrates has an inclined portion on at least one of the two opposite sides which is connected to one of the two opposite surfaces, and has an included angle greater than 90 degrees and less than 180 degrees in association with the connected surface.

The display device can further include a light source. The light emitted from the light source passes through the one of the two substrates between which the liquid crystal is sandwiched, and a portion of the light moves in the one of the two substrates and is guided by the inclined portion off the one of the two substrates in a different direction than the light passing through the two substrates. For example, the direction of the light guided by the inclined portion is opposite to the direction of the light passes through the two substrates, so as to reduce the light leakage at the lateral side of the display device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A display device, comprising:
   two substrates, each of which has two opposite surfaces and two opposite sides; and
   a liquid crystal layer sandwiched between the two substrates;
   wherein at least one of the two substrates has an inclined portion on at least one of the two opposite sides which is connected to one of the two opposite surfaces and has an included angle greater than 90 degrees and less than 180 degrees in association with the connected surface;
   wherein the at least one of the two opposite sides has a vertical portion connecting the other one of the two opposite surfaces, and the inclined portion is greater than the vertical portion in roughness, wherein a portion of the vertical portion is concave.

2. The display device as claimed in claim 1, further comprising a light source disposed adjacent to one of the two substrates.

3. The display device as claimed in claim 2, wherein the one of the two substrates adjacent to the light source has the inclined portion on at least one of the two opposite sides.

4. The display device as claimed in claim 3, wherein a light emitted from the light source passes through the one of the two substrates between which the liquid crystal is sandwiched and a portion of the light moves in the one of the two substrates and is guided by the inclined portion off the one of the two substrates in a different direction than the light passing through the two substrates.

5. The display device as claimed in claim 2, wherein one of the two opposite surfaces which is connected to the inclined portion faces the light source.

6. The display device as claimed in claim 2, wherein the light source is direct-type backlight.

7. The display device as claimed in claim 1, wherein the at least one of the two substrates has another inclined portion and another vertical portion, the inclined portion and the vertical portion are disposed on one of the two opposite sides, and the another inclined portion and the another vertical portion are disposed on another one of the two opposite sides.

8. The display device as claimed in claim 7, wherein the inclined portion and the another inclined portion are different in roughness.

9. The display device as claimed in claim 1, wherein the one of the two opposite surfaces connected to the inclined portion is a lower surface, and the inclined portion is greater than the lower surface in roughness.

10. The display device as claimed in claim 9, wherein another one of the two opposite surfaces not connected to the inclined portion is an upper surface, and the inclined portion is greater than the upper surface in roughness.

11. The display device as claimed in claim 1, wherein the included angle is ranged from 135° to 165°.

12. The display device as claimed in claim 1, wherein in a cross-sectional view, a ratio of a length of the inclined portion to a length of the vertical portion is ranged from 0.2 to 2.

13. The display device as claimed in claim 1, wherein a roughness of the inclined portion is ranged from 1 μm to 5 μm.

14. The display device as claimed in claim 1, wherein a length of the vertical portion is greater than half of a thickness of the at least one of the two substrates having the inclined portion.

15. The display device as claimed in claim 1, wherein the vertical portion is connected to the inclined portion.

16. The display device as claimed in claim 1, further comprising a circuit board disposed on a side of the at least one of the two substrates having the inclined portion, and the circuit board and the inclined portion are disposed on different sides of the at least one of the two substrates.

* * * * *